United States Patent
Yamanaka

(10) Patent No.: US 6,266,302 B1
(45) Date of Patent: Jul. 24, 2001

(54) OPTICAL DISK APPARATUS

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/266,884

(22) Filed: Mar. 12, 1999

(30) Foreign Application Priority Data

Mar. 12, 1998 (JP) .................................................. 10-061735

(51) Int. Cl.$^7$ ...................................................... G11B 7/09
(52) U.S. Cl. ............................ 369/44.23; 369/44.25; 369/112.23
(58) Field of Search .................. 369/44.23, 44.11, 369/44.12, 44.28, 44.27, 44.25, 44.41, 110, 109, 112, 112.01, 112.08, 112.23, 112.24, 112.25

(56) References Cited

U.S. PATENT DOCUMENTS

| | | | |
|---|---|---|---|
| 5,870,353 | * | 2/1999 | Morimoto et al. ...................... 369/13 |
| 5,910,932 | * | 6/1999 | Watanabe et al. ..................... 369/13 |

FOREIGN PATENT DOCUMENTS

| | | |
|---|---|---|
| 196 40 838 A1 | 4/1997 | (DE) . |
| 0 553 541 A1 | 8/1993 | (EP) . |
| 0 664 541 A1 | 7/1995 | (EP) . |
| 0 810 598 A2 | 12/1997 | (EP) . |
| 58-185047 | 10/1983 | (JP) . |
| 5-258320 | 10/1993 | (JP) . |
| 7-210872 | 8/1995 | (JP) . |
| 9-115185 | 5/1997 | (JP) . |
| 9-231588 | 9/1997 | (JP) . |
| 10-40568 | 2/1998 | (JP) . |
| 10-64104 | 3/1998 | (JP) . |
| 10-302320 | 11/1998 | (JP) . |
| WO98/49680 | 11/1998 | (WO) . |

* cited by examiner

Primary Examiner—Muhammad Edun
(74) Attorney, Agent, or Firm—McGinn & Gibb, PLLC

(57) ABSTRACT

An optical disk apparatus includes an optical disk, a laser source, an objective lens, an astigmatic element, and a photodetector. Recording tracks are formed in both grooves and lands of the optical disk. The laser source emits a laser beam. The objective lens focuses the laser beam emitted by the laser source to form a fine spot on a recording track of the optical disk. The astigmatic element is placed in a convergent optical system for focusing the beam reflected by the optical disk, to receive the beam reflected by the optical disk and emit an astigmatic beam. The photodetector detects the astigmatic beam emerging from the astigmatic element. The optical disk apparatus serves to perform at least focal adjustment of the objective lens by using a detection signal from the photodetector. A relation $$0.8 < \lambda/(Tp \cdot NA) < 1.1$$

is satisfied where $\lambda$ is a wavelength of the laser beam emitted by the laser source, NA is a numerical aperture of the objective lens, and Tp is a pitch size of the grooves.

7 Claims, 4 Drawing Sheets

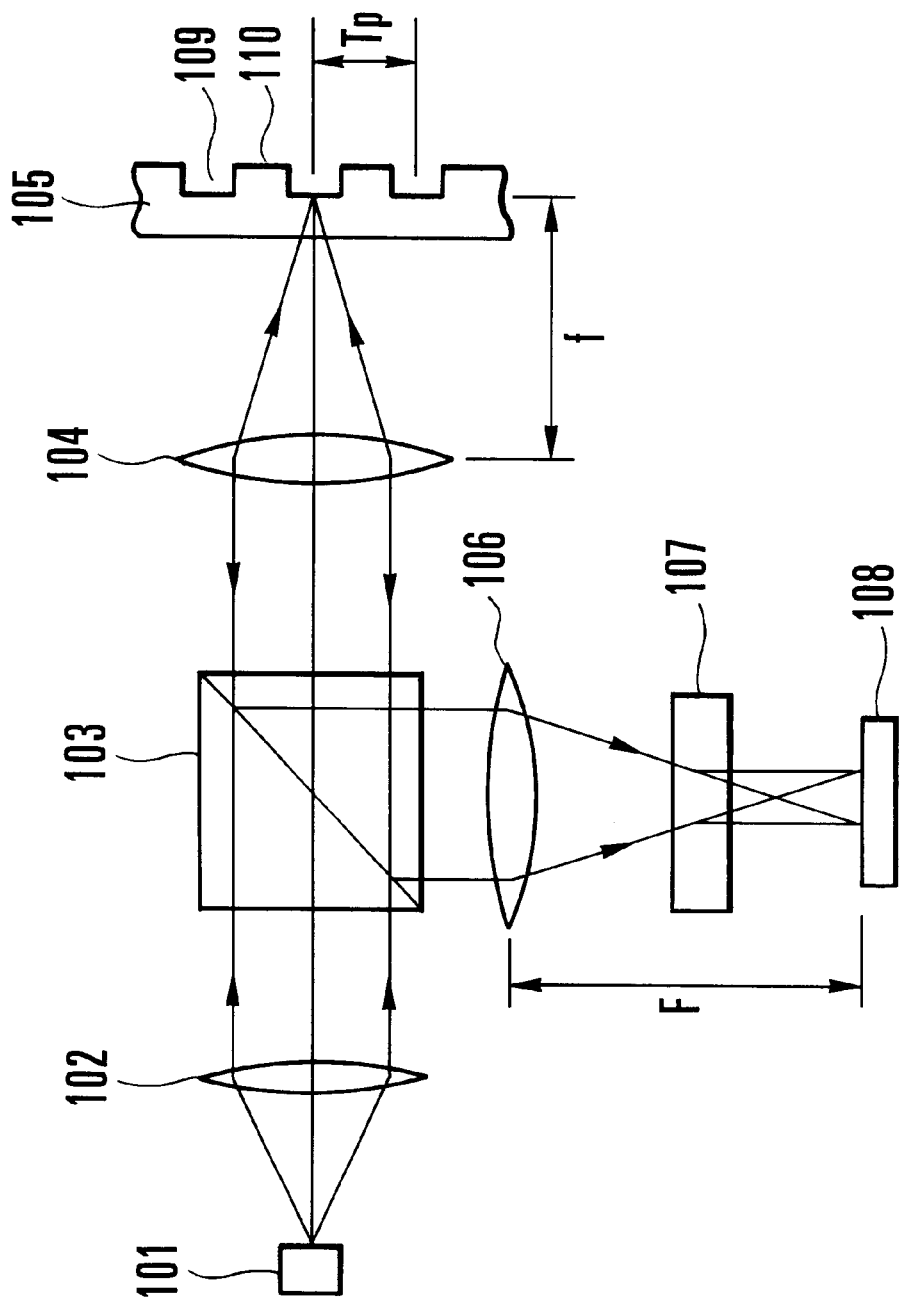
F I G. 1

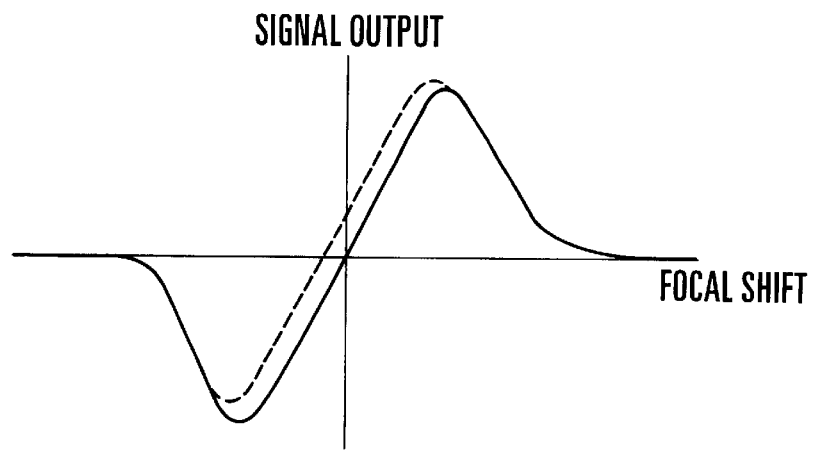
FIG. 7
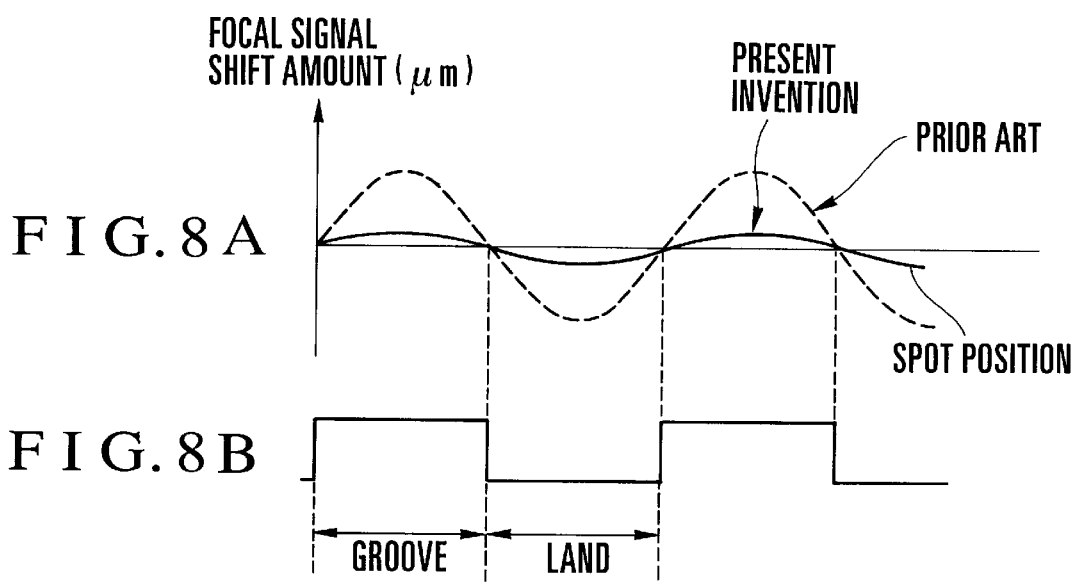
FIG. 8A
FIG. 8B

OPTICAL DISK APPARATUS

BACKGROUND OF THE INVENTION

The present invention relates to an optical disk apparatus for recording/reproducing information by using a light beam and, more particularly, to an optical disk apparatus for recording information on grooves and/or lands formed in an optical recording medium.

An optical disk apparatus records information on and reproduces recorded information from grooves and/or lands formed in an optical recording medium by utilizing optical magnetism or phase change. Generally, a laser beam must irradiate the grooves and lands after it is focused by using an objective lens. For this purpose, a focal position shift of the laser beam is detected, and focusing of the objective lens is controlled on the basis of the detected focal position shift. Conventionally, a method called astigmatic method is widely used as a method of detecting this focal position shift.

According to this method, as shown in FIG. 4, an exit beam from a laser source 1 is focused by an objective lens 4 to form a fine spot through a beam splitter 3, to irradiate the recording surface of an optical disk 5. The beam reflected by the optical disk 5 is split by the beam splitter 3 and converted by an astigmatic element 7, e.g., a cylindrical lens, that generates astigmatism into an astigmatic beam in which its focal positions differ between the X and Y directions on a plane perpendicular to the traveling direction of the beam, as shown in FIG. 5. The astigmatic beam emerging from the astigmatic element 7 is received by a 4-division photodetector 8 constituted by 4 photodetection elements to detect its focal shift amount.

More specifically, when the 4-division photodetector 8 is set at an intermediate position A, B, or C (FIG. 5) of a distance L between the two focal points of the astigmatic beam in the optical axis direction such that the dividing directions of the 4 detection elements form an angle of 45o with respect to the X and Y directions of the astigmatic beam, the beam shape on the 4-division photodetector 8 changes in accordance with the focal shift amount (positions A to C) as shown in FIGS. 6A to 6C.

When detection signals detected by divisional regions (photodetection elements) 8a and 8d, and 8b and 8c at the diagonal positions of the 4-division photodetector 8 are summed and the difference between the sum signals is calculated, a focal shift amount having an S-shaped curve as indicated by a solid line in FIG. 7 can be obtained. The zero-crossing point of this S-shaped curve is recognized as the in-focus position. An in-focus state on the optical disk can be obtained by adjusting the position of the objective lens with respect to the optical disk such that the focal shift amount becomes zero.

Generally, localization in diffracted beam distribution generated by a shift in the focusing spot position of the light beam, which is focused on a groove and land of an optical disk by an objective lens, occurs in a direction perpendicularly intersecting the direction of track length. According to the astigmatic method, when a difference between detection signals of two adjacent divisional regions of the 4-division photodetector 8 is obtained, the position shift signal of a focal position in the direction of track width, i.e., a tracking signal, can be detected simultaneously, and tracking adjustment can be performed simultaneously.

In the focal shift amount obtained by the astigmatic method described above, it is recognized that an offset occurs wherein the focal shift amount at the in-focus position does not become zero, as indicated by a broken line in FIG. 7, particularly when grooves and lands are formed in the recording surface of the optical disk. When information is recorded on both the grooves and lands as in an optical disk in recent high-density recording, if the focal shift amount is to be detected by the astigmatic method, the offset becomes different between the grooves and lands, as indicated by a broken line in FIGS. 8A and 8B.

According to the measurement done by the present inventor, the difference in focal shift amount between the grooves and lands is considerably larger than the depth (about 80 nm with a wavelength of 650 nm) ⅛ a wavelength $\lambda$ of the laser source, which is the depth of the grooves employed in a general optical disk, and sometimes reaches a value of about 0.3 $\mu$m. The depth of the grooves in this conventional case is the one with which the track error signal in the push-pull method becomes the maximum when tracking adjustment is performed by utilizing a diffracted beam, as described above.

When such a large focal shift amount occurs, it cannot be moderated by only adjusting the position of the photodetector, and information recording on both the grooves and lands set at the optimum focal positions cannot be performed. This problem occurs not only when a finite-system objective lens is used, as shown in FIG. 4, but also when an infinite-system objective lens and collimator lens are used or a focusing lens is used independently in a reflected beam detection system.

SUMMARY OF THE INVENTION

It is an object of the present invention to provide an optical disk apparatus in which an offset in the focal shift amount between the grooves and lands is decreased or eliminated to enable good focal adjustment for an optical disk.

In order to achieve the above object, according to the present invention, there is provided an optical disk apparatus comprising an optical disk on which recording tracks are formed in both grooves and lands thereof, a laser source for emitting a laser beam, an objective lens for focusing the laser beam emitted by the laser source to form a fine spot on a recording track of the optical disk, an astigmatic element placed in a convergent optical system for focusing the beam reflected by the optical disk, to receive the beam reflected by the optical disk and emit an astigmatic beam, and a photodetector for detecting the astigmatic beam emerging from the astigmatic element, the optical disk apparatus serving to perform at least focal adjustment of the objective lens by using a detection signal from the photodetector, wherein a relation $$0.8 < \lambda/(Tp \cdot NA) < 1.1$$

is satisfied where $\lambda$ is a wavelength of the laser beam emitted by the laser source, NA is a numerical aperture of the objective lens, and Tp is a pitch size of the grooves.

BRIEF DESCRIPTION OF THE DRAWINGS

FIG. 1 is a conceptual view showing the arrangement of an optical disk apparatus according to an embodiment of the present invention;

FIG. 7 is a graph for explaining an offset in focal shift amount in an optical disk apparatus; and FIGS. 8A and 8B are graphs for explaining a difference in offset between the grooves and lands.

DESCRIPTION OF THE PREFERRED EMBODIMENT

Figure 2:
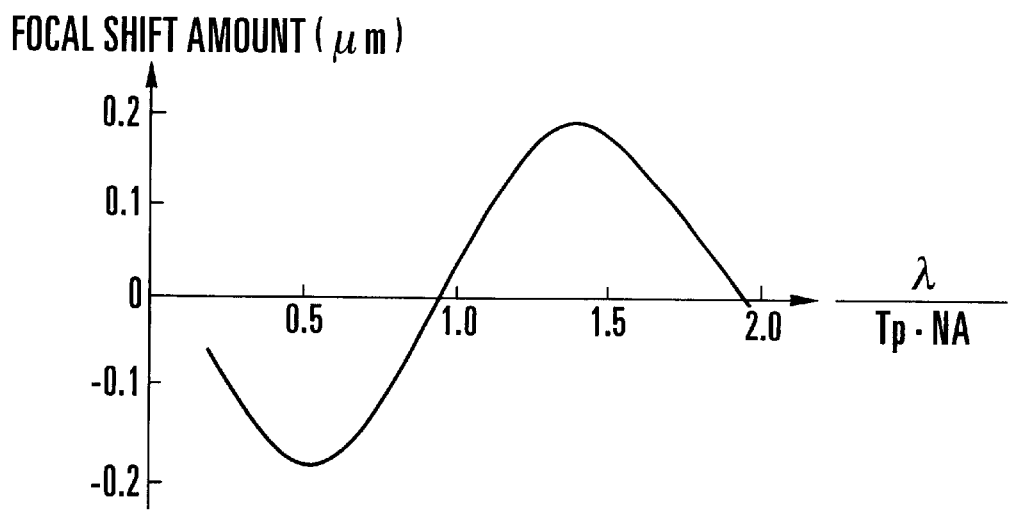
FIG. 2 is a graph showing the correlation among a wavelength $\lambda$ of the laser beam, a numerical aperture NA of the objective lens, a pitch size Tp of the grooves, and the focal shift amount in order to show the principle of the present invention.

The present invention will be described in detail with reference to the accompanying drawings.

FIG. 1 schematically shows the arrangement of an optical disk apparatus according to an embodiment of the present invention. A laser beam emitted by a laser source 101 and having a wavelength $\lambda$ is converted by a collimator lens 102 into a parallel beam. The parallel beam emerging from the collimator lens 102 passes through a beam splitter 103 and is focused by an objective lens 104 having a focal length f and a numerical aperture N4 to form a fine spot on the recording surface of an optical disk 105. Grooves 109 and lands 110 are alternately, spirally formed on the optical disk 105 and are respectively recorded with information. The period, i.e., the pitch size, of the grooves 109 is Tp.

The beam reflected by the optical disk 105 is converted by the objective lens 104 into a parallel beam and is reflected and deflected by the objective lens 104. The deflected beam emerging from the objective lens 104 is focused by a focusing lens 10 having a focal length F and passes through an astigmatic element 107 such as a cylindrical lens to form an astigmatic beam having different focal positions in the X and Y directions on a plane perpendicular to the optical axis. This astigmatic beam is received by a 4-division photodetector 108 constituted by four photodetection elements divided into a 2×2 matrix.

The 4-division photodetector 108 is placed at an intermediate position between the two focal positions of the astigmatic beam in the direction of optical axis. The division lines of the photodetection elements that intersect each other in a criss-cross manner form an angle of 45° in the X and Y directions of the astigmatic element 107.

Figures 6A, 6B, 6C:
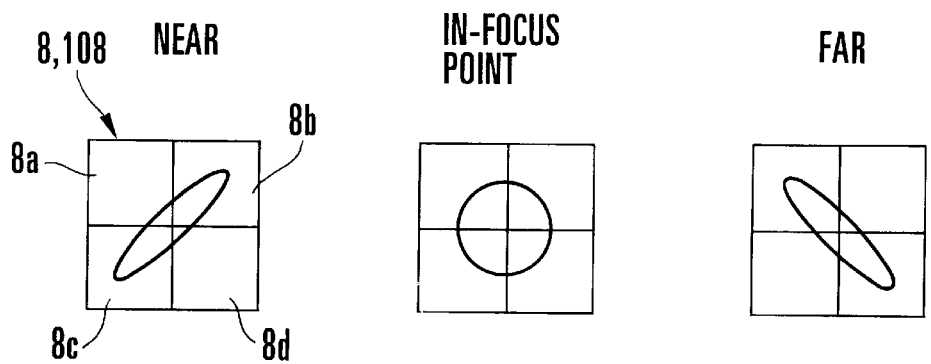
FIGS. 6A to 6C are views showing a state in which the astigmatic beam is received by the photodetectors shown in FIG. 5.

In the optical disk apparatus having this arrangement, the shape of the astigmatic beam on the 4-division photodetector 108 changes in accordance with the in-focus state of the objective lens 104 with respect to the optical disk 105, as shown in FIGS. 6A to 6C. Accordingly, a focal shift amount having an S-shaped curve indicated by the solid line in FIG. 7 can be obtained by summing detection signals detected by divisional regions (photodetection elements) 8a and 8d, and 8b and 8c at the diagonal positions of the 4-division photodetector 108 and calculating differences between the respective sum signals. The position of the optical axis of the objective lens 104 with respect to the optical disk 105 is adjusted such that this focal shift amount becomes zero, thus enabling focal adjustment with respect to the optical disk 105.

When a difference in the detection signal between the two adjacent divisional regions of the 4-division photodetector 108 is calculated, a position shift signal in the direction of track width, i.e., a tracking signal, can be detected simultaneously, so that tracking adjustment can be performed simultaneously.

In the optical disk apparatus described above, the present inventor examined the relationship among the focal shift amount between the grooves 109 and lands 110, as shown in FIGS. 8A and 8B, and the respective preset values of the optical disk apparatus, and found out that the pitch size Tp of the grooves 109, the numerical aperture NA of the objective lens 104, and a value obtained from the wavelength $\lambda$ of the laser beam emitted by the laser source 101, i.e., $\lambda/(Tp \cdot NA)$, had a correlation with the focal shift amount. FIG. 2 shows a graph showing a curve of this correlation, in which the axis of abscissa represents $\lambda/(Tp \cdot NA)$ and the axis of ordinate represents the focal shift amount ($\mu$m).

This characteristic curve differs depending on the depth of the grooves 109. In this case, a case wherein the depth of the grooves 109 is $\frac{1}{8}\lambda$ with which the track error signal obtained by the push-pull method becomes the maximum is shown. $\lambda/(Tp \cdot NA)$ is a parameter indicating to which position of the opening of the objective lens 104 the center of the 1st-order diffracted beam diffracted by the grooves 109 having the uniform pitch size on the optical disk 105 returns.

Therefore, it is known from this curve that it suffices if the parameter is set such that the focal shift amount becomes zero. For example, if this parameter is set to "2", the focal position shift amount can be decreased to zero. More specifically, when the parameter is "2", the 1-st order diffracted beam is located outside the objective lens 104. A beam distribution identical to that obtained when the beam is reflected by a flat surface having no grooves 109 can be obtained, and the focal shift amount becomes zero.

When, however, a tracking signal for performing tracking adjustment described above is to be detected simultaneously, information on the 1-st order diffracted beam must be included in the opening of the objective lens 104. The parameter cannot be set to larger than "2", and the focal shift amount cannot be set to zero.

As shown in FIG. 2, when the parameter is set to a value close to "0", the focal shift amount also decreases. However, the wavelength $\lambda$ and the numerical aperture NA of the objective lens 104 cannot be largely changed from the existing values due to the manufacturing and characteristic limitations. Accordingly, the pitch size Tp of the grooves 109 is to be increased. To increase the pitch size Tp is to increase the gap among the grooves 109. Therefore, the number of grooves 109 in the optical disk 105 is decreased to decrease the recording density of the optical disk 105. Hence, this method cannot be employed in high-density recording.

In the present invention, the parameter is set to a value slightly smaller than "1" with which the focal shift amount causes zero crossing. An accurate value that causes this zero crossing slightly changes depending on other elements such as the focal length. As the result of various types of measurements conducted by the present inventor, it was confirmed that if the parameter was set to a value between 0.8 and 1.1, the focal shift amount could be suppressed to a value equal to or smaller than at least half the worst value. Accordingly, if the wavelength $\lambda$ of the laser beam emitted by the laser source 101, the numerical aperture NA of the objective lens 104, and the pitch size Tp of the grooves 109 are designed to satisfy:

$$0.8 < \lambda/(Tp \cdot NA) < 1.1$$

then the focal shift amount between the grooves 109 and lands 110 can be set to zero or a value close to zero, as indicated by the solid line in FIG. 7.

Figure 3:
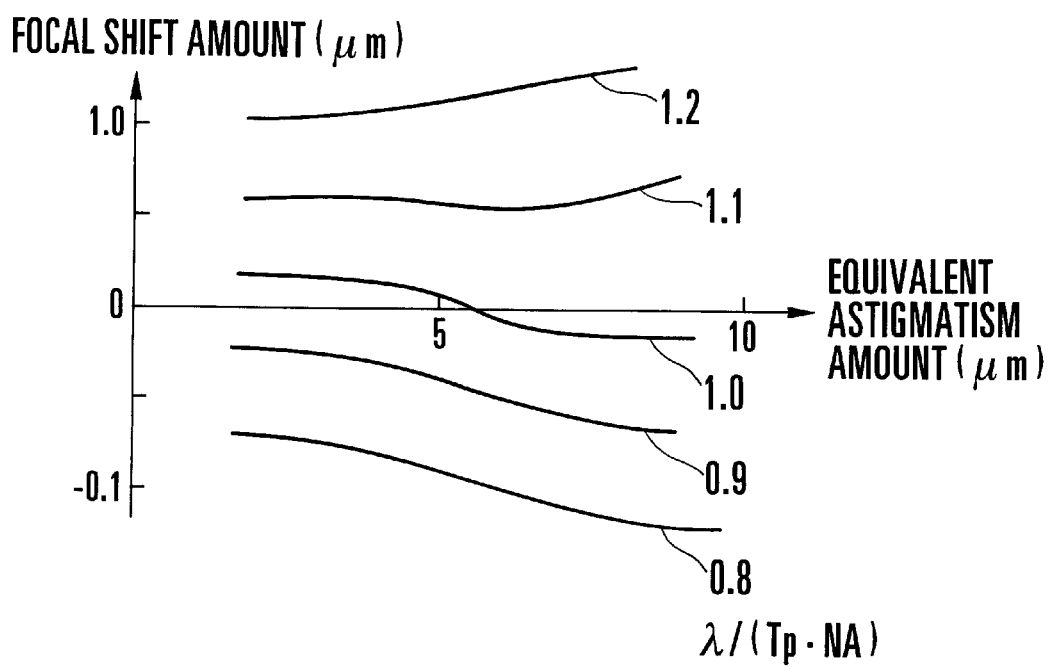
FIG. 3 is a graph showing the correlation between an equivalent astigmatism amount and a focal shift amount.
Figure 5:
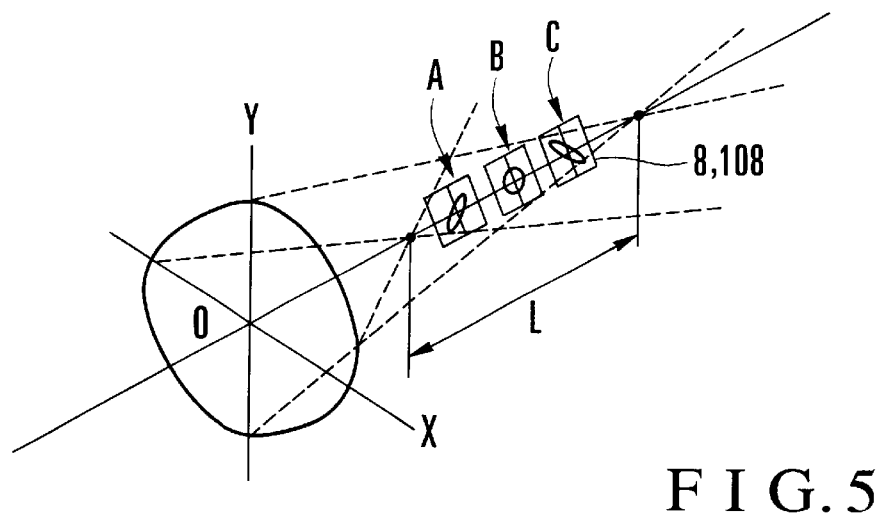
FIG. 5 is a view for explaining the two focal positions of an astigmatic beam and the position of a photodetector.

The present inventor also studied the equivalent astigmatism amount (f2/F2)·L, obtained by replacing the length L (FIG. 5) in the direction of optical axis between the two focal positions generated by the focusing lens 10 and astigmatic element 107, i.e., the astigmatism amount L, with an astigmatism amount of the optical disk 105 obtained by the objective lens 104, by using a value λ/(Tp·NA) as the parameter. As a result, a correlation between the equivalent astigmatism amount L and the focal shift amount became obvious, as shown in FIG. 3. FIG. 3 shows that when the equivalent astigmatism amount increases, even if the parameter is kept unchanged, the focal shift amount increases.

Therefore, if the equivalent astigmatism amount is limited to a value equal to a certain value or less, the focal shift amount can be decreased. Assuming that the focal shift amount allowed in an ordinary optical disk apparatus is limited to about twice the minimum value, it has become apparent from the following curve:

$$\lambda/(Tp \cdot NA) = 0.9$$

that it sufficed if the equivalent astigmatism amount was limited to 8 µm or less.

It was also apparent from FIG. 3 that, in an optical disk apparatus that could perform stable recording, a correlation was present between a parameter λ/(Tp·NA), with which the focal shift amount could be decreased to almost zero, and the equivalent astigmatism amount (f2/F2)·L. For example, if λ/(Tp·NA)=1.0, then the equivalent astigmatism amount (f2/F2)·L=5.5 µm, and the focal shift amount becomes substantially zero. If λ=0.=µm and NA=0.6, the grooves pitch size Tp becomes about 1.08 µm, and the track pitch of the optical disk 105 having both the grooves 109 and lands 110 as the recording tracks becomes about 0.54 µm. When such a parameter combination is selected, a stable optical disk apparatus can be realized.

Figure 4:
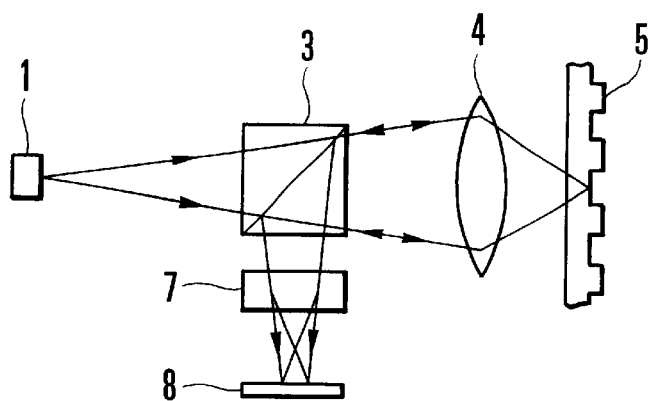
FIG. 4 is a view showing the concept of a conventional optical disk apparatus.

The present invention can similarly be applied to an optical system in which a finite-system objective lens also serves as a collimator lens and a detection-system focusing lens, in the same manner as in the arrangement shown in FIG. 4, and the focal length of the optical disk side is f and the focal length of the detection system side is F. A hologram element can be utilized as an astigmatic element for generating astigmatism.

As has been described above, according to the present invention, when the wavelength λ of the laser beam, the numerical aperture NA of the objective lens, and the pitch size Tp of the grooves are set to satisfy 0.8<λ/(Tp·NA)21 1.1 the focal shift amount can be set to zero or a value close to zero.

When the focal length f of the objective lens, the focal length F of the convergent optical system for obtaining a focal point signal shift amount, and the distance L between the two focal points on the optical axis obtained by astigmatism are set to satisfy (f2/F2)·L<8 µm, the focal point signal shift amount can be set to zero or a value close to zero regardless of a difference in equivalent astigmatism amount.

As a result, in an optical disk apparatus having both the grooves and lands as the recording tracks, higher-precision focal adjustment can be realized for both the grooves and lands, so that an optical disk apparatus having a small focal shift amount can be realized.

What is claimed is:

1. An optical disk apparatus having a reduced offset in the focal shift amount between the grooves and lands, said apparatus comprising:

an optical disk on which recording tracks are formed in both grooves and lands thereof;

a laser source for emitting a laser beam;

an objective lens for focusing the laser beam emitted by said laser source to form a fine spot on a recording track of the optical disk;

an astigmatic element placed in a convergent optical system for focusing the beam reflected by the optical disk and emit an astigmatic beam; and a photodetector for detecting the astigmatic beam emerging from said astigmatic element, said optical disk apparatus serving to perform at least focal adjustment of said objective lens by using a detection signal from said photodetector, wherein a relation $$0.8 < \lambda/(Tp \cdot NA) < 1.1$$

is satisfied, where λ is a wavelength of the laser beam emitted by said laser source, NA is a numerical aperture of said objective lens, and Tp is a pitch size of said grooves, thereby causing a reduced offset in the focal shift amount between the grooves and lands.

2. An apparatus according to claim 1, wherein said photodetector has four photodetection elements divided into a 2×2 matrix by cross-cross division lines.

3. An apparatus according to claim 1, wherein a focal position shift signal obtained at an in-focus position where the astigmatic beam is focused is set to substantially zero.

4. An apparatus according to claim 1, further comprising a beam splitter for reflecting and deflecting the beam reflected by the optical disk and passing through said objective lens, and a focusing lens constituting said convergent optical system to focus the beam deflected by said beam splitter onto a detection surface of said photodetector through said astigmatic element.

5. An optical disk apparatus comprising:

an optical disk on which recording tracks are formed in both grooves and lands thereof;

a laser source for emitting a laser beam;

an objective lens for focusing the laser beam emitted by said laser source to form a fine sport on a recording track of the optical disk;

an astigmatic element placed in a convergent optical system for focusing the beam reflected by the optical disk and emit an astigmatic beam; and a photodetector for detecting the astigmatic beam emerging from said astigmatic element, said optical disk apparatus serving to perform at least focal adjustment of said objective lens by using a detection signal from said photodetector, wherein a relation $$0.8 < \lambda/(Tp \cdot NA) < 1.1$$

is satisfied, where λ is a wavelength of the laser beam emitted by said laser source, NA is a numerical aperture of said objective lens, and Tp is a pitch size of said grooves, and wherein a relation $$(f2/F2) \cdot L < 8 \mu m$$

is satisfied, where f is a focal length of said objective lens, F is a focal length of said convergent optical system, and L is a distance between two focal positions where the astigmatic beam is focused in a direction of optical axis.

6. An optical disk apparatus comprising:

an optical disk on which recording tracks are formed in both grooves and lands thereof;

a laser source for emitting a laser beam;

an objective lens for focusing the laser beam emitted by said laser source to form a fine sport on a recording track of the optical disk;

an astigmatic element placed in a convergent optical system for focusing the beam reflected by the optical disk and emit an astigmatic beam; and a photodetector for detecting the astigmatic beam emerging from said astigmatic element, said optical disk apparatus serving to perform at least focal adjustment of said objective lens by using a detection signal from said photodetector, wherein a relation $$0.8 < \lambda/(Tp \cdot NA) < 1.1$$

is satisfied, where $\lambda$ is a wavelength of the laser beam emitted by said laser source, NA is a numerical aperture of said objective lens, and Tp is a pitch size of said grooves, wherein said photodetector has four photodetection elements divided into a 2×2 matrix by cross-cross division lines, and wherein said astigmatic element focuses the astigmatic beam on different focal positions in X and Y directions on a plane perpendicular to an optical axis, said photodetector is placed between two focal positions where the astigmatic beam is focused in a direction of optical axis, said division lines of said photodetection elements form an angle of 45° with the X and Y directions on a convergent plane of said convergent optical system, and a focal position shift signal is generated by a difference in sum output between said photodetection elements located at diagonal positions.

7. A method of minimizing an offset in the focal shift amount between grooves and lands in an optical disk apparatus comprising an optical source, an objective lens, and an optical disk on which recording tracks are formed in both grooves and lands thereof, said method comprising:

selecting values for parameters $\lambda$, Tp, and NA based on the relation $$0.8 < \lambda/(Tp \cdot NA) < 1.1$$

where $\lambda$ is a wavelength of the beam emitted by said optical source, NA is a numerical aperture of said objective lens, and Tp is a pitch size of said grooves.

* * * * *